United States Patent
Bahadure et al.

(10) Patent No.: US 8,683,156 B2
(45) Date of Patent: Mar. 25, 2014

(54) FORMAT-PRESERVING DEDUPLICATION OF DATA

(75) Inventors: Ashutosh Kanhaiya Bahadure, Lake Mary, FL (US); Carl James Appellof, Santa Rosa, CA (US); Edward Michael Goble, Winter Springs, FL (US)

(73) Assignee: Symantec Corporation, Mountain View, CA (US)

( * ) Notice: Subject to any disclaimer, the term of this patent is extended or adjusted under 35 U.S.C. 154(b) by 278 days.

(21) Appl. No.: 13/313,969

(22) Filed: Dec. 7, 2011

(65) Prior Publication Data

US 2013/0151802 A1 Jun. 13, 2013

(51) Int. Cl.
*G06F 12/00* (2006.01)

(52) U.S. Cl.
USPC .......................................... 711/162; 711/202

(58) Field of Classification Search
USPC .................................................. 711/162, 202
See application file for complete search history.

(56) References Cited

U.S. PATENT DOCUMENTS 8,204,871 B1 * 6/2012 Pawar et al. ................... 707/705
2005/0066095 A1 * 3/2005 Mullick et al. ................ 710/200

* cited by examiner

*Primary Examiner* — Reginald Bragdon
*Assistant Examiner* — Mehdi Namazi
(74) *Attorney, Agent, or Firm* — Wilmer Cutler Pickering Hale and Dorr LLP (57) ABSTRACT

Data blocks are copied from a source (e.g., a source virtual disk) to a target (e.g., a target virtual disk). The source virtual disk format is preserved on the target virtual disk. Offsets for extents stored in the target virtual disk are converted to offsets for corresponding extents in the source virtual disk. A map of the extents for the source virtual disk can therefore be used to create, for deduplication, segments of data that are aligned to boundaries of the extents in the target virtual disk.

20 Claims, 6 Drawing Sheets

EXTENT MAP 600

| FILE NAME | EXTENT(S) | OFFSET | LENGTH | START |
|---|---|---|---|---|
| F1 | 501<br>503 | S1<br>S3 | 3<br>3 | x1<br>z1 |
| F2 | 502 | S2 | 3 | y1 |
| F3 | 504 | S4 | 2 | a1 |

| OFFSETS ON TARGET | OFFSETS ON SOURCE |
|---|---|
| T1 | S1 |
| T2 | S2 |
| T3 | S3 |
| T4 | S4 |

FORMAT-PRESERVING DEDUPLICATION OF DATA

BACKGROUND

By making a backup copy of an active database at a point in time, the state of the database at that point in time can be restored if, for example, the database subsequently becomes corrupted or is lost. Deduplication of data can reduce the amount of storage space and bandwidth consumed by backups and restores. With deduplication, after a segment of data is stored, other instances of data that match that segment are replaced with a reference to the stored segment of data.

There are many techniques that provide deduplication for virtual hard disks. One such technique uses file extents to create segments for a given virtual disk (an extent is a contiguous region of physical storage, usually corresponding to a file; a segment may include one or more extents). Another technique is based on the Rabin fingerprinting technique. However, conventional deduplication techniques fail to preserve the format of the virtual disks. Instead, virtual disks in formats such as Virtual Machine Disk (VMDK) format and Virtual Hard Disk (VHD) format are converted to the TAR (tape archive) file format, for example. This can be a disadvantage because, for example, more time is needed to recover deduplicated files because of the time needed to convert the data back to the native VMDK or VHD format.

SUMMARY

According to embodiments of the present disclosure, data blocks are copied from a source (e.g., a source virtual disk) to a target (e.g., a target virtual disk). Offsets for extents stored in the target virtual disk are converted to offsets for corresponding extents in the source virtual disk. A map of the extents for the source virtual disk can therefore be used to create, for deduplication, segments of data that are aligned to boundaries of the extents in the target virtual disk.

More specifically, in one embodiment, file system metadata on the source virtual disk is accessed to generate a file system extent map of the source virtual disk. Data blocks from the source virtual disk are copied to and stored on the target virtual disk. The source virtual disk format is preserved on the target virtual disk. In one embodiment, the source virtual disk is scanned to identify and collect used data blocks, and only the used blocks are stored on the target virtual disk. Metadata that includes offsets for extents in the source virtual disk and offsets for extents in the target virtual disk is accessed. For example, offsets can be found in grain tables for VMDK-formatted disks and in block allocation tables for VHD-formatted disks. A reverse lookup is performed to convert offsets on the target virtual disk to corresponding offsets on the source virtual disk. After the offsets are converted, the file system extent map (that was generated for the source virtual disk) can be applied to the target virtual disk for deduplication. The file system extent map is used by the deduplication application to find data segment boundaries on the target virtual disk that align with extent boundaries. As a result, the effectiveness of deduplication is improved relative to conventional techniques.

As noted, embodiments according to the present disclosure preserve the format of the source virtual disk format on the target virtual disk. Because the format is preserved, files can be quickly recovered by mounting the disks where the deduplicated data segments are stored. Thus, files can be recovered faster relative to conventional techniques, improving system availability. Also, new virtual machines can be quickly created and brought online by adding deduplicated disks to the virtual machines without requiring a data restore operation. Thus, virtual machines can be created and provisioned faster relative to conventional techniques.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "copying," "converting," "accessing," "using," "creating," "deduplicating," "storing," "determining," "generating," "scanning," "parsing," or the like, refer to actions and processes (e.g., flowchart 1000 of FIG. 10) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
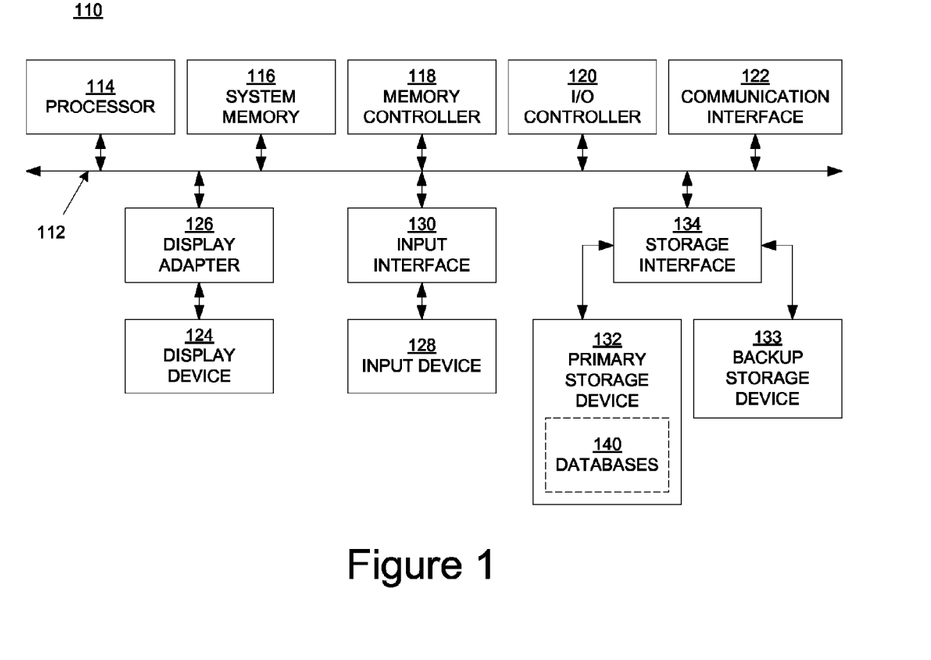
FIG. 1 is a block diagram of an example of a computing system capable of implementing embodiments according to the present disclosure.

FIG. 1 is a block diagram of an example of a computing system 110 capable of implementing embodiments of the present disclosure. The computing system 110 broadly represents any single or multi-processor computing device or system capable of executing computer-readable instructions. Examples of the computing system 110 include, without limitation, workstations, laptops, client-side terminals, servers, distributed computing systems, handheld devices, or any other computing system or device. In its most basic configuration, the computing system 110 may include at least one processor 114 and a system memory 116.

The processor 114 generally represents any type or form of processing unit capable of processing data or interpreting and executing instructions. In certain embodiments, the processor 114 may receive instructions from a software application or module. These instructions may cause the processor 114 to perform the functions of one or more of the example embodiments described and/or illustrated herein. For example, the processor 114 may perform and/or be a means for performing, either alone or in combination with other elements, one or more of the identifying, determining, using, implementing, translating, tracking, receiving, moving, and providing described herein. The processor 114 may also perform and/or be a means for performing any other steps, methods, or processes described and/or illustrated herein.

The system memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments the computing system 110 may include both a volatile memory unit (such as, for example, system memory 116) and a non-volatile storage device (such as, for example, the primary storage device 132).

The computing system 110 may also include one or more components or elements in addition to the processor 114 and the system memory 116. For example, in the embodiment of FIG. 1, the computing system 110 includes a memory controller 118, an input/output (I/O) controller 120, and a communication interface 122, each of which may be interconnected via a communication infrastructure 112. The communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

The memory controller 118 generally represents any type or form of device capable of handling memory or data or controlling communication between one or more components of the computing system 110. For example, the memory controller 118 may control communication between the processor 114, system memory 116, and the I/O controller 120 via the communication infrastructure 112. Memory controller may perform and/or be a means for performing, either alone or in combination with other elements, one or more of the operations or features described herein.

The I/O controller 120 generally represents any type or form of module capable of coordinating and/or controlling the input and output functions of a computing device. For example, the I/O controller 120 may control or facilitate transfer of data between one or more elements of the computing system 110, such as the processor 114, system memory 116, the communication interface 122, the display adapter 126, the input interface 130, and the storage interface 134. The I/O controller 120 may be used, for example, to perform and/or be a means for performing, either alone or in combination with other elements, one or more of the operations described herein. The I/O controller 120 may also be used to perform and/or be a means for performing other operations and features set forth in the instant disclosure.

The communication interface 122 broadly represents any type or form of communication device or adapter capable of facilitating communication between the example computing system 110 and one or more additional devices. For example, the communication interface 122 may facilitate communication between the computing system 110 and a private or public network including additional computing systems. Examples of the communication interface 122 include, without limitation, a wired network interface (such as a network interface card), a wireless network interface (such as a wireless network interface card), a modem, and any other suitable interface. In one embodiment, the communication interface 122 provides a direct connection to a remote server via a direct link to a network, such as the Internet. The communication interface 122 may also indirectly provide such a connection through, for example, a local area network (such as an Ethernet network), a personal area network, a telephone or cable network, a cellular telephone connection, a satellite data connection, or any other suitable connection.

The communication interface 122 may also represent a host adapter configured to facilitate communication between the computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. The communication interface 122 may also allow the computing system 110 to engage in distributed or remote computing. For example, the communication interface 122 may receive instructions from a remote device or send instructions to a remote device for execution. The communication interface 122 may perform and/or be a means for performing, either alone or in combination with other elements, one or more of the operations disclosed herein. The communication interface 122 may also be used to perform and/or be a means for performing other operations and features set forth in the instant disclosure.

As illustrated in FIG. 1, the computing system 110 may also include at least one display device 124 coupled to the communication infrastructure 112 via a display adapter 126. The display device 124 generally represents any type or form of device capable of visually displaying information forwarded by the display adapter 126. Similarly, the display adapter 126 generally represents any type or form of device configured to forward graphics, text, and other data from the communication infrastructure 112 (or from a frame buffer, as known in the art) for display on the display device 124.

As illustrated in FIG. 1, the computing system 110 may also include at least one input device 128 coupled to the communication infrastructure 112 via an input interface 130. The input device 128 generally represents any type or form of input device capable of providing input, either computer-generated or human-generated, to the computing system 110. Examples of the input device 128 include, without limitation, a keyboard, a pointing device, a speech recognition device, or any other input device. In one embodiment, the input device 128 may perform and/or be a means for performing, either alone or in combination with other elements, one or more of the operations disclosed herein. The input device 128 may also be used to perform and/or be a means for performing other operations and features set forth in the instant disclosure.

As illustrated in FIG. 1, the computing system 110 may also include a primary storage device 132 and a backup storage device 133 coupled to the communication infrastructure 112 via a storage interface 134. The storage devices 132 and 133 generally represent any type or form of storage device or medium capable of storing data and/or other computer-readable instructions. For example, the storage devices 132 and 133 may be a magnetic disk drive (e.g., a so-called hard drive), a floppy disk drive, a magnetic tape drive, an optical disk drive, a flash drive, or the like. The storage interface 134 generally represents any type or form of interface or device for transferring data between the storage devices 132 and 133 and other components of the computing system 110.

In one example, the databases 140 may be stored in the primary storage device 132. The databases 140 may represent portions of a single database or computing device or a plurality of databases or computing devices. For example, the databases 140 may represent (be stored on) a portion of computing system 110 and/or portions of the example network architecture 200 in FIG. 2 (below). Alternatively, the databases 140 may represent (be stored on) one or more physically separate devices capable of being accessed by a computing device, such as the computing system 110 and/or portions of the network architecture 200. In one embodiment, the databases 140 are Structured Query Language (SQL) databases.

Continuing with reference to FIG. 1, the storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 132 and 133 may also include other similar structures or devices for allowing computer software, data, or other computer-readable instructions to be loaded into the computing system 110. For example, the storage devices 132 and 133 may be configured to read and write software, data, or other computer-readable information. The storage devices 132 and 133 may also be a part of the computing system 110 or may be separate devices accessed through other interface systems.

The storage devices 132 and 133 may be used to perform, and/or be a means for performing, either alone or in combination with other elements, one or more of the operations disclosed herein. The storage devices 132 and 133 may also be used to perform, and/or be a means for performing, other operations and features set forth in the instant disclosure.

Many other devices or subsystems may be connected to the computing system 110. Conversely, all of the components and devices illustrated in FIG. 1 need not be present to practice the embodiments described herein. The devices and subsystems referenced above may also be interconnected in different ways from that shown in FIG. 1. The computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of the storage devices 132 and 133. When executed by the processor 114, a computer program loaded into the computing system 110 may cause the processor 114 to perform and/or be a means for performing the functions of the example embodiments described and/or illustrated herein. Additionally or alternatively, the example embodiments described and/or illustrated herein may be implemented in firmware and/or hardware. For example, the computing system 110 may be configured as an application specific integrated circuit (ASIC) adapted to implement one or more of the embodiments disclosed herein.

Figure 2:
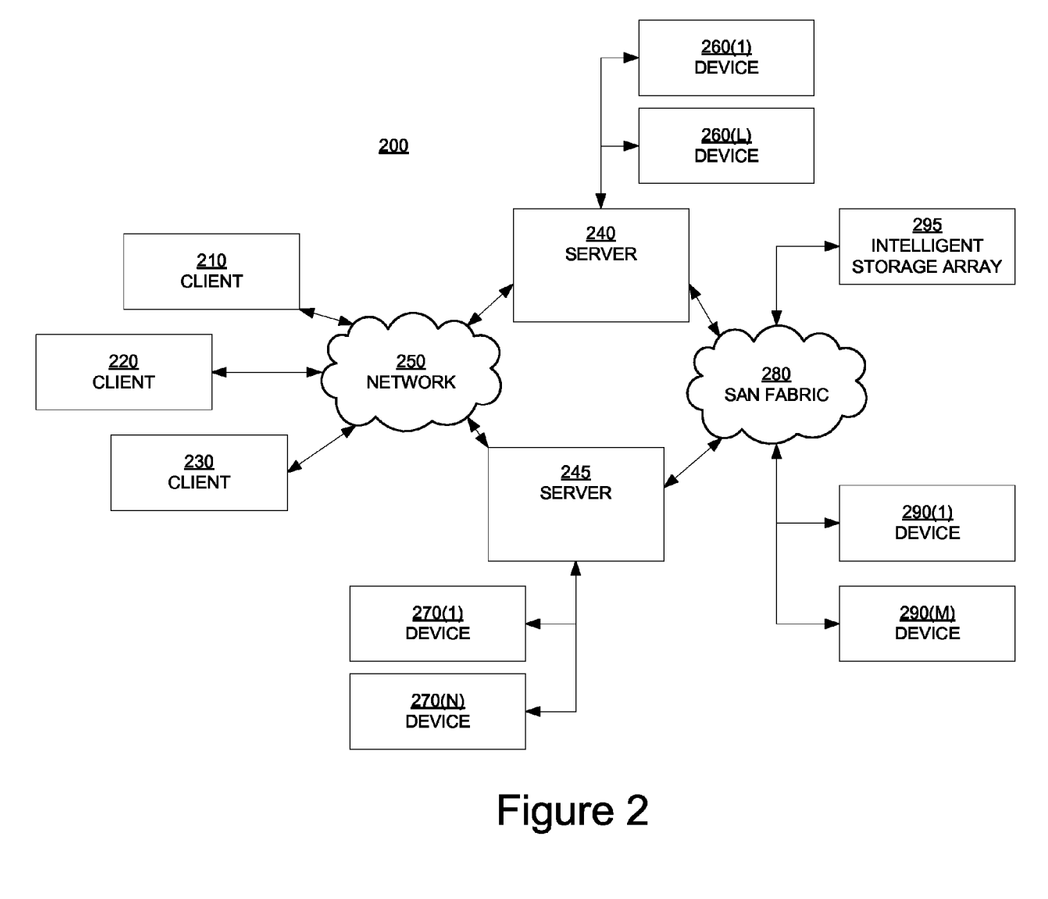
FIG. 2 is a block diagram of an example of a network architecture capable of implementing embodiments according to the present disclosure.

FIG. 2 is a block diagram of an example of a network architecture 200 in which client systems 210, 220, and 230 and servers 240 and 245 may be coupled to a network 250. The client systems 210, 220, and 230 generally represent any type or form of computing device or system, such as the computing system 110 of FIG. 1.

Similarly, the servers 240 and 245 generally represent computing devices or systems, such as application servers or database servers, configured to provide various database services and/or run certain software applications. The network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to the server 240. Similarly, one or more storage devices 270(1)-(N) may be directly attached to the server 245. The storage devices 260(1)-(L) and storage devices 270(1)-(N) generally represent any type or form of storage device or medium capable of storing data and/or other computer-readable instructions. The storage devices 260(1)-(L) and storage devices 270(1)-(N) may represent network-attached storage (NAS) devices configured to communicate with the servers 240 and 245 using various protocols, such as Network File System (NFS), Server Message Block (SMB), or Common Internet File System (CIFS).

The servers 240 and 245 may also be connected to a storage area network (SAN) fabric 280. The SAN fabric 280 generally represents any type or form of computer network or architecture capable of facilitating communication between storage devices. The SAN fabric 280 may facilitate communication between the servers 240 and 245 and the storage devices 290(1)-(M) and/or an intelligent storage array 295. The SAN fabric 280 may also facilitate, via the network 250 and the servers 240 and 245, communication between the client systems 210, 220, and 230 and the storage devices 290(1)-(M) and/or intelligent storage array 295 in such a manner that the devices 290(1)-(M) and the array 295 appear as locally attached devices to the client systems 210, 220, and 230. As with the storage devices 260(1)-(L) and the storage devices 270(1)-(N), the storage devices 290(1)-(M) and the intelligent storage array 295 generally represent any type or form of storage device or medium capable of storing data and/or other computer-readable instructions.

With reference to the computing system 110 of FIG. 1, a communication interface, such as communication interface 122, may be used to provide connectivity between each client system 210, 220, and 230 and the network 250. The client systems 210, 220, and 230 may be able to access information on the server 240 or 245 using, for example, a Web browser or other client software. Such software may allow the client systems 210, 220, and 230 to access data hosted by the server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by the server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in the server 240, run by the server 245, and distributed to the client systems 210, 220, and 230 over the network 250. Accordingly, the network architecture 200 may perform and/or be a means for performing, either alone or in combination with other elements, one or more of the operations disclosed herein. The network architecture 200 may also be used to perform and/or be a means for performing other operations and features set forth in the instant disclosure.

Figure 3:
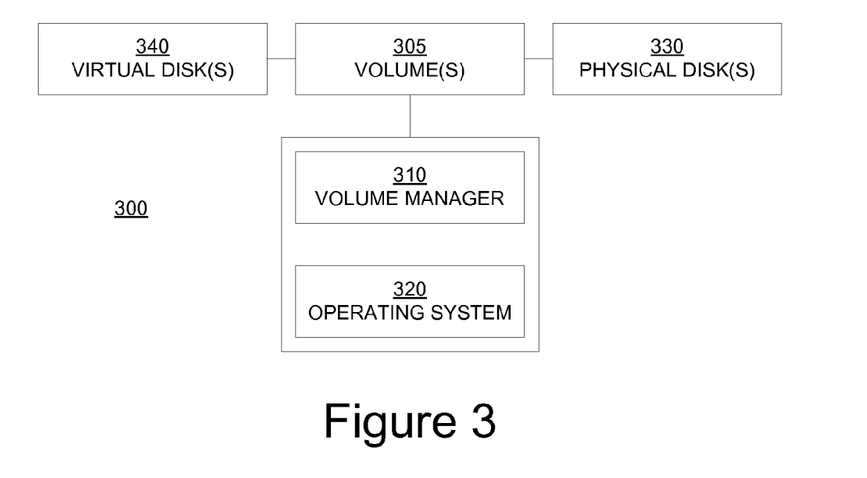
FIG. 3 is a block diagram illustrating an embodiment of a volume management system according to an embodiment of the present disclosure.

FIG. 3 is a block diagram illustrating an embodiment of a volume management system 300. The system 300 can be implemented as computer-executable components residing on a computer-readable storage medium. For example, the system 300 can be implemented as part of a virtual machine that is implemented using the system 210 of FIG. 2.

With reference to FIG. 3, a volume manager 310 operates as a subsystem between an operating system 320 and one or more volumes 305 of data (blocks of data) that are stored in a data storage system (see FIG. 2 for examples). The data storage system may include physical storage devices such as an array of physical disks, LUNs (SCSI logical units), or other types of hardware that are used to store data. The volume manager 310 overcomes restrictions associated with the physical storage devices by providing a logical volume management layer that allows data to be spread across multiple physical disks within a disk array (not shown) in a manner that is transparent to the operating system 320, in order to distribute and/or balance input/output (I/O) operations across the physical disks.

Each of the volumes 305 can retrieve data from one or more of the physical storage devices (e.g., physical disk(s) 330), and the volumes 305 are accessed by file systems, databases, and other applications in the same way that physical storage devices are accessed. To simply the volumes' exposure to the systems and devices that make up the system 210 of FIG. 2, one or more virtual disks 340 are established. Each virtual disk 340 may include one or more of the physical disks 330. The virtual disks 340 appear to other devices to be physical devices. For example, a device can send and receive I/O commands to and from a virtual disk 340 as if the virtual disk were a physical disk.

Figure 4:
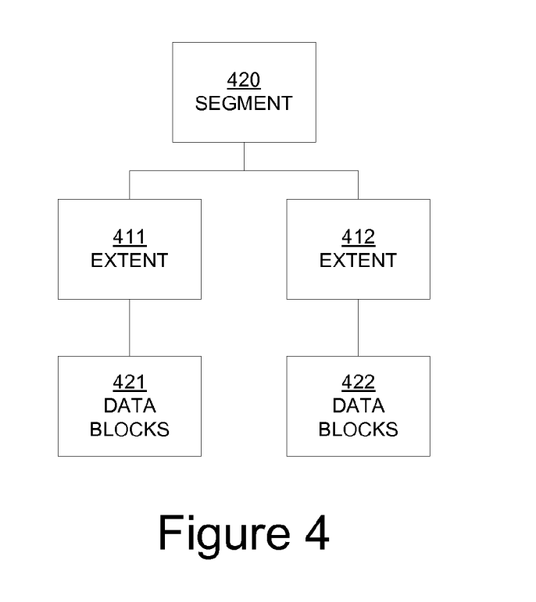
FIG. 4 is a block diagram illustrating elements of a database according to an embodiment of the present disclosure.

In the example of FIG. 4, data is stored in contiguous data blocks 401 and contiguous data blocks 402. A data block may also be referred to as a disk sector. Each data block/sector corresponds to a certain number of bytes of physical storage space. An extent is a specific number of contiguous data blocks allocated to storing that data. Data blocks within an extent may be used or unused as data is inserted or deleted. In the example of FIG. 4, extent 411 includes data blocks 401, and extent 412 includes data blocks 402. A segment 420 includes a set of one or more extents.

Figure 5:
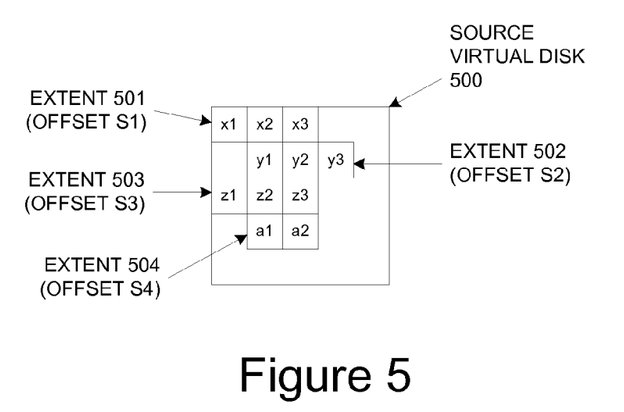
FIG. 5 is a block diagram representing an example of a source virtual disk according to embodiments of the present disclosure.

FIG. 5 is a block diagram representing a source virtual disk 500 according to embodiments of the present disclosure. In the example of FIG. 5, the source virtual disk 500 includes four extents 501, 502, 503, and 504 (501-504). Extents may or may not be contiguous with one another. In the example of FIG. 5, the extents 501-504 are separated by unused data blocks (unused data blocks are represented as empty spaces in FIG. 5). Unused data blocks between extents may exist because those blocks have not yet been allocated to an extent.

The extents 501-504 may be associated with a single file. Alternatively, one or more of the extents may be associated with one file, while other extents are associated with another file. Also, the extents for one file may be separated from one another by one or more extents associated with one or more other files. Thus, for example, extents 501 and 503 may be associated with one file (e.g., file F1), while extent 502 and extent 504 may each be associated with a different file (e.g., files F2 and F3, respectively).

Figure 6:
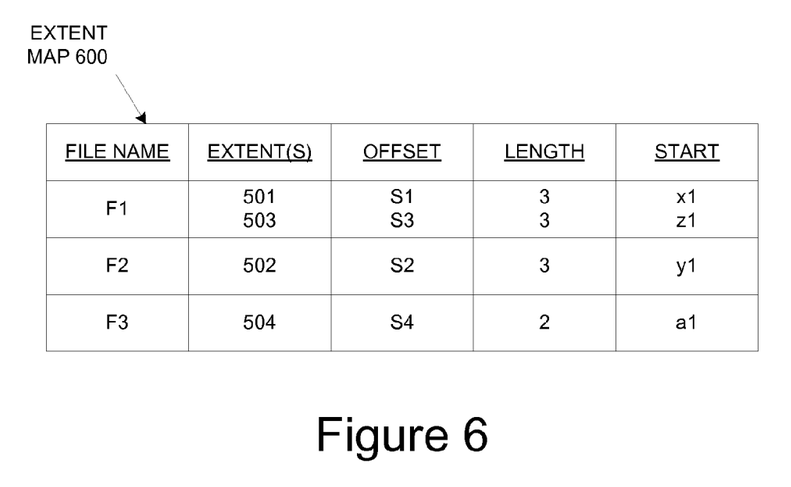
FIG. 6 illustrates an example of an extent map according to an embodiment of the present disclosure.

The file system on the source virtual disk 500 can be accessed (scanned) to generate a file system extent map. FIG. 6 illustrates an example of an extent map 600 based on the example mentioned above. In general, an extent map is a list of pointers that point to all the data extents of a file. The extent map includes, for each file on the source virtual disk, the name of the file and the extent(s) associated with that file. Entries in the extent map are ranges of contiguous blocks allocated to the file. Each entry consists of the block offset of the entry in the file, the length of the extent in blocks, and the starting block of the extent in the file system.

Figure 7:
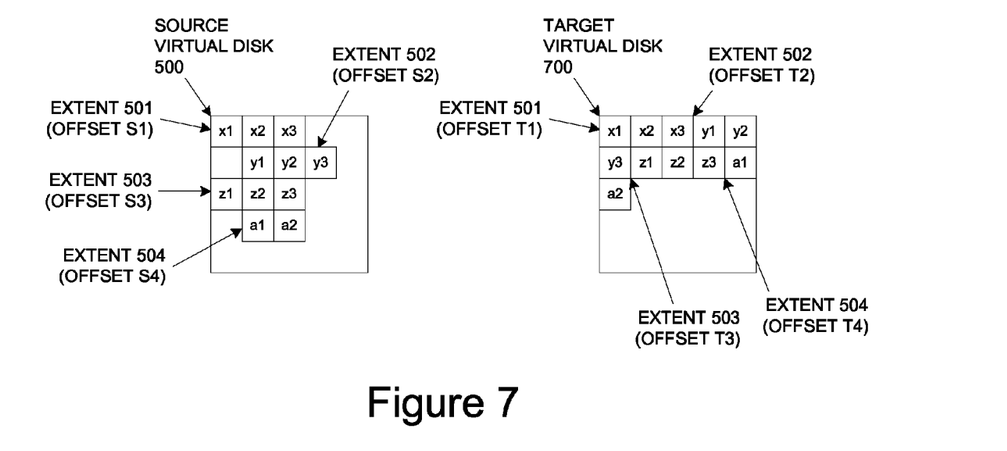
FIG. 7 is a block diagram illustrating a source virtual disk and a target virtual disk according to embodiments of the present disclosure.

According to embodiments of the present disclosure, with reference to FIG. 7, data blocks (extents) in the source virtual disk 500 are copied to a target virtual disk 700. The data blocks may be copied as part of a backup or disaster recovery process, for example, prior to application of a deduplication process.

Importantly, the format of the data on the source virtual disk 500 is preserved on the target virtual disk 700. If, for example, the data on the source virtual disk 500 is in VMDK format, then the data copied to the target virtual disk 700 is also stored in VMDK format, and if the data on the source virtual disk 500 is in VHD format, then the data copied to the target virtual disk 700 is also stored in VHD format. Specifically, the data is not converted to a different format, such as the TAR format. Accordingly, the data on the target virtual disk 700 (as well as the data on the source virtual disk 500) is stored in a directly mountable format. That is, the data on the virtual disks can be mounted directly onto a new virtual machine (VM) without having to convert the data into an acceptable VM format such as VMDK or VHD. As such, a new VM can be created and brought on line more quickly relative to conventional approaches. Also, files can be recovered more quickly relative to conventional approaches by simply mounting the virtual disks.

Furthermore, only the used data blocks are copied from the source virtual disk 500 to the target virtual disk 700. More specifically, a backup application can scan the source virtual disk 500 and identify used data blocks. Information about which data blocks are used can be collected using a methodology provided by a server hosting a virtual machine; such methodologies are known in the art as changed block tracking, for example, and can identify data blocks (disk sectors) that are in use and data blocks that have changed since a previous backup. Alternatively, information about which data blocks are used can be collected by scanning metadata for the source virtual disk 500. For example, in NTFS (New Technology File System), file data is stored as metadata in the Master File Table (MFT). By storing only used data blocks on the target virtual disk 700, the amount of backup data is reduced.

In the example of FIG. 7, the unused data blocks between the extents are not copied from the source virtual disk 500 to the target virtual disk 700. Because only the used data blocks are copied from the source virtual disk 500, the backup application creates a sparse VMDK-formatted or VHD-formatted target store. However, because the target virtual disk 700 is a sparse disk, the extent map 600 created for the source virtual disk 500 does not map directly to the target virtual disk. For example, a file at offset 0xF000 on the source virtual disk 500 may map to offset 0xA000 on the target virtual disk 700. Thus, the deduplication application cannot use the extent map 600 (by itself) to identify data segments that can be deduplicated.

In general, as in the above example or for some different reason, the offset for an extent of data on a target virtual disk may be different from the offset for the corresponding extent of data on a source virtual disk.

Embodiments according to the present disclosure address this by converting the offsets on the target virtual disk 700 to the offsets on the source virtual disk 500. This can be accomplished in a VMDK environment by parsing the grain table—a grain table entry points to the offset of an extent on a virtual disk—and performing a reverse lookup to convert an offset for an extent on the target virtual disk 700 to an offset for the corresponding extent on the source virtual disk 500. In a VHD environment, this can be accomplished by parsing the block allocation table, which provides offset information similar to that of a grain table, and performing a reverse lookup as just mentioned.

Figure 8:
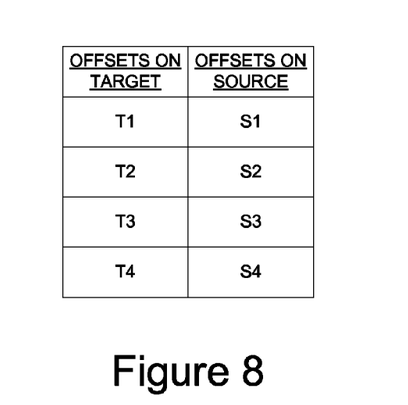
FIG. 8 illustrates an example of a mapping of source and target virtual disk offsets according to embodiments of the present disclosure.

FIG. 8 provides an example of the results of an offset conversion process, in which offsets on the target virtual disk 700 (represented as T1, T2, T3, and T4 in FIG. 7) and offsets on the source virtual disk 500 (represented as S1, S2, S3, and S4 in FIG. 7) are mapped to one another. In a VMDK environment, offsets can be converted as follows. For a data block/sector on the target virtual disk 700 that is being written, the offset aligned to the grain size (e.g., the grain size in VMDK 1.1 is 64K) preceding that sector is found—that offset is referred to below as "offsetGrainAlignedinSectors"—and the remainder (R) is stored. The remainder is equal to: (sector_number*512) grainSizeInBytes. The grain directory is accessed to find the grain directory entry (nGDE) for the sector. The grain directory entry is read to find the corresponding grain table entry (nGTE). The grain table entries are searched to find the offset offsetGrainAlignedinSectors. The physical sector on the source virtual disk 500 can then be computed as: nGDE*size of (each GDE)+nGTE*size of (each GTE)+R.

Once the file extent offsets on the target virtual disk 700 are converted to offsets on the source virtual disk 500, then the extent map 600 (FIG. 6) can be applied for deduplication. More specifically, the extent map 600 can be used to identify data segments in the target virtual disk 700 that can be deduplicated—that is, data segments that match previously stored data segments can be identified and replaced with references to the previously stored data segments.

Figure 9:
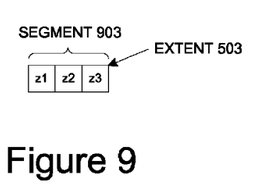
FIG. 9 illustrates an example of aligning data segment and extent boundaries according to embodiments of the present disclosure.

In particular, according to embodiments of the present disclosure, the extent map 600 can be used to intelligently identify, for deduplication, data segment boundaries that are aligned to extent boundaries. As shown in the example of FIG. 9, boundaries for the data segment 903 and the extent 503 are aligned. By aligning data segment boundaries with extent boundaries, deduplication is improved in at least two ways. First, adding or deleting files in a VMDK or VHD environment will not affect the deduplication rate. Second, identical files across different virtual machines can be deduplicated.

Figure 10:
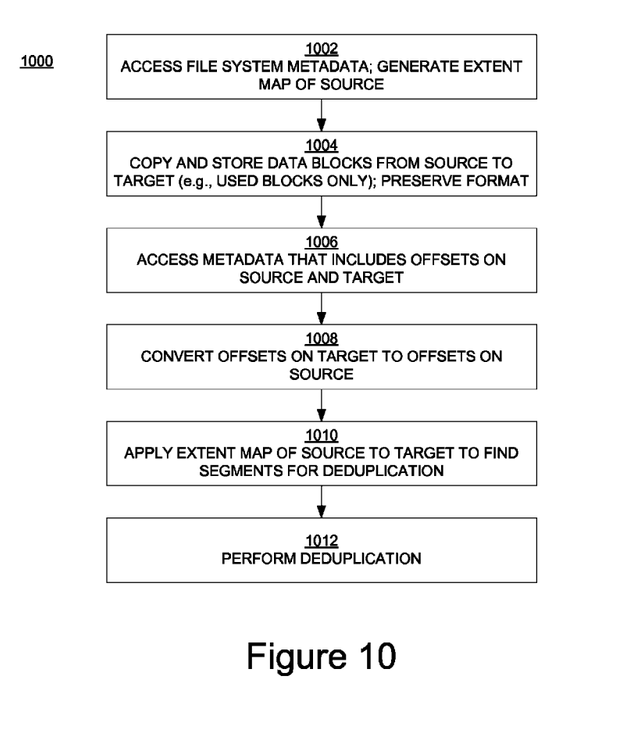
FIG. 10 is a flowchart of an example of a method for managing data according to embodiments of the present disclosure.

FIG. 10 is a flowchart 1000 of an example of a computer-implemented process for managing data according to embodiments of the present disclosure. The flowchart 1000 can be implemented as computer-executable instructions residing on some form of non-transitory computer-readable storage medium (e.g., using computing system 110 of FIG. 1).

In block 1002 of FIG. 10, file system metadata on the source virtual disk is accessed to generate a file system extent map of the source virtual disk.

In block 1004, data blocks from the source virtual disk are copied to and stored on the target virtual disk. In one embodiment, the source virtual disk is scanned to identify and collect used data blocks, and only the used blocks are stored on the target virtual disk.

In block 1006, metadata that includes offsets for extents in the source virtual disk and offsets for extents in the target virtual disk is accessed. For example, offsets can be found in grain tables for VMDK-formatted disks and in block allocation tables for VHD-formatted disks.

In block 1008, a reverse lookup is performed to convert offsets on the target virtual disk to corresponding offsets on the source virtual disk.

In block 1010, after the offsets are converted, the file system extent map (that was generated for the source virtual disk) can be applied to the target virtual disk for deduplication. More specifically, the file system extent map is used by the deduplication application to find data segment boundaries that align with extent boundaries in the target virtual disk.

In block 1012, data segments in the target virtual disk that match previously stored data segments are deduplicated. That is, each of those data segments is replaced with a reference to a previously stored, matching data segment.

In summary, embodiments according to the present disclosure permit the use of a file system extent map to determine data segment boundaries for deduplication, and align the data segment boundaries with extent boundaries, thereby providing effective deduplication for a virtual machine as well as across virtual machines. Also, the format of the data is preserved, allowing backup data to be restored by mounting a virtual disk, which enables faster recovery and also allows virtual machines to be created and brought online faster. By storing only used data blocks, the amount of stored data is further reduced.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions that, when executed, cause a computer system to perform a method comprising:
copying data blocks from a source to a target;
converting offsets for extents comprising one or more of said data blocks stored in said target to offsets for corresponding extents of data blocks in said source;
accessing a map of said extents for said source; and
using said map of extents for said source to create, for deduplication, segments of data that are aligned to boundaries of said extents in said target, said segments each comprising one or more of said extents in said target.

2. The computer-readable storage medium of claim 1 wherein said source comprises a first virtual disk and said target comprises a second virtual disk.

3. The computer-readable storage medium of claim 1 wherein said data blocks in said source and said data blocks stored in said target have the same format.

4. The computer-readable storage medium of claim 3 wherein said format is selected from the group consisting of: Virtual Machine Disk (VMDK) format and Virtual Hard Disk (VHD) format.

5. The computer-readable storage medium of claim 1 wherein said converting comprises accessing file system metadata to determine said offsets in said source and said offsets in said target.

6. The computer-readable storage medium of claim 5 wherein said metadata is selected from the group consisting of: grain tables for data in Virtual Machine Disk (VMDK) format, and block allocation tables for data in Virtual Hard Disk (VHD) format.

7. The computer-readable storage medium of claim 1 wherein said copying comprises copying used data blocks but not unused data blocks from said source to said target.

8. The computer-readable storage medium of claim 1 further comprising deduplicating data stored on said target by replacing segments of data that match previously stored segments of data with references to said previously stored segments.

9. A system comprising:
    a processor; and
    memory coupled to said processor and having stored therein instructions that, if executed by said system, cause said system to perform operations comprising:
    storing data blocks in a target virtual disk, said data blocks stored in said target virtual disk comprising copies of used data blocks but not unused data blocks from a source virtual disk;
    converting offsets for extents comprising one or more of said data blocks stored in said target virtual disk to offsets for corresponding extents of data blocks in said source virtual disk;
    generating a map of said extents for said source virtual disk; and
    using said map of extents for said source virtual disk to create, for deduplication, segments of data that are aligned to boundaries of said extents in said target virtual disk, said segments each comprising one or more of said extents in said target virtual disk.

10. The system of claim 9 wherein said data blocks in said source virtual disk and said data blocks stored in said target virtual disk have the same format.

11. The system of claim 10 wherein said format is selected from the group consisting of: Virtual Machine Disk (VMDK) format and Virtual Hard Disk (VHD) format.

12. The system of claim 9 wherein said converting comprises accessing metadata of said source virtual disk and metadata of target virtual disk to determine said offsets in said source virtual disk and said offsets in said target virtual disk.

13. The system of claim 12 wherein said metadata of said source virtual disk and metadata of target virtual disk are selected from the group consisting of:
    grain tables for data in Virtual Machine Disk (VMDK) format, and block allocation tables for data in Virtual Hard Disk (VHD) format.

14. A computer-implemented method of managing data, said method comprising:
    accessing file system metadata on a source virtual disk;
    generating, with said file system metadata, a map of extents stored on said source virtual disk, said extents each comprising one or more physically contiguous data blocks for a respective file;
    copying a subset of said data blocks stored on said source virtual disk to a target virtual disk;
    converting offsets for extents comprising one or more of said data blocks stored in said target virtual disk to offsets for corresponding extents in said source virtual disk; and
    using said map of extents for said source virtual disk to create, for deduplication, segments of data that are aligned to a boundary of an extent in said target virtual disk, said segments each comprising one or more of said extents in said target virtual disk.

15. The method of claim 14 wherein said data blocks in said source virtual disk and said data blocks stored in said target virtual disk have the same format.

16. The method of claim 15 wherein said format is selected from the group consisting of: Virtual Machine Disk (VMDK) format and Virtual Hard Disk (VHD) format.

17. The method of claim 14 wherein said converting comprises determining said offsets in said source virtual disk and said offsets in said target virtual disk by accessing first metadata for said source virtual disk and second metadata for said target virtual disk.

18. The method of claim 17 wherein said first metadata and said second metadata are selected from the group consisting of: grain tables for data in Virtual Machine Disk (VMDK) format, and block allocation tables for data in Virtual Hard Disk (VHD) format.

19. The method of claim 14 wherein said subset comprises used data blocks but not unused data blocks from said source virtual disk.

20. The method of claim 14 wherein said deduplication comprises replacing segments of data on said target virtual disk that match previously stored segments of data with references to said previously stored segments.

* * * * *